US006347656B1

(12) United States Patent
Dreher

(10) Patent No.: US 6,347,656 B1
(45) Date of Patent: Feb. 19, 2002

(54) VENEER-JOINTING MACHINE

(75) Inventor: Volker Dreher, Zeutern (DE)

(73) Assignee: Holzindustrie Bruchsal GmbH, Bruchsal (DE)

( * ) Notice: Subject to any disclaimer, the term of this patent is extended or adjusted under 35 U.S.C. 154(b) by 0 days.

(21) Appl. No.: 09/498,836

(22) Filed: Feb. 4, 2000

(30) Foreign Application Priority Data

Feb. 4, 1999 (DE) ........................................ 199 04 438

(51) Int. Cl.[7] ................................................ B32B 31/04

(52) U.S. Cl. ..................... 156/544; 156/583.1; 156/499

(58) Field of Search ................................ 156/544, 502, 156/157, 583.1, 580, 543, 499

(56) References Cited

U.S. PATENT DOCUMENTS

| | | | | | |
|---|---|---|---|---|---|
| 5,230,766 | A | * | 7/1993 | Kuper et al. | 156/544 |
| 5,401,354 | A | * | 3/1995 | Colucci | 156/580 |
| 5,716,045 | A | * | 2/1998 | Taylor | 269/303 |
| 5,795,431 | A | * | 8/1998 | Weissfloch | 156/358 |

FOREIGN PATENT DOCUMENTS

| | | | |
|---|---|---|---|
| DE | 28 28 901 | | 3/1979 |
| DE | 31 52 554 | | 11/1985 |
| DE | 3539842 | * | 11/1985 |

* cited by examiner

*Primary Examiner*—Richard Crispino
*Assistant Examiner*—Yewebdar T Tadesse
(74) *Attorney, Agent, or Firm*—Venable; Gabor J. Kelemen

(57) ABSTRACT

A veneer-jointing machine comprising a two-part worktable 1 with a fixed table plate 6 and a movable table plate 7, which can be joined to the fixed one, further comprising a heating device 2 that is arranged above the juncture of the table plates 6, 7 and can be lowered, a positioning jig 3 that is located opposite the heating device between the table plates 6, 7 and can be raised, a clamping rail 4 that is arranged above the fixed table plate 6 and operates in the direction of the table plate 6, as well as several pressure shoes 5 that are arranged side-by-side on the movable table plate 7 and can be moved at an acute angle to this plate, in the direction of the juncture. The veneer-jointing machine allows joining veneer strips with narrow widths. In addition, the user can exactly predetermine the surface appearance of the veneer to be produced.

10 Claims, 3 Drawing Sheets

VENEER-JOINTING MACHINE

DESCRIPTION

Figure 1:
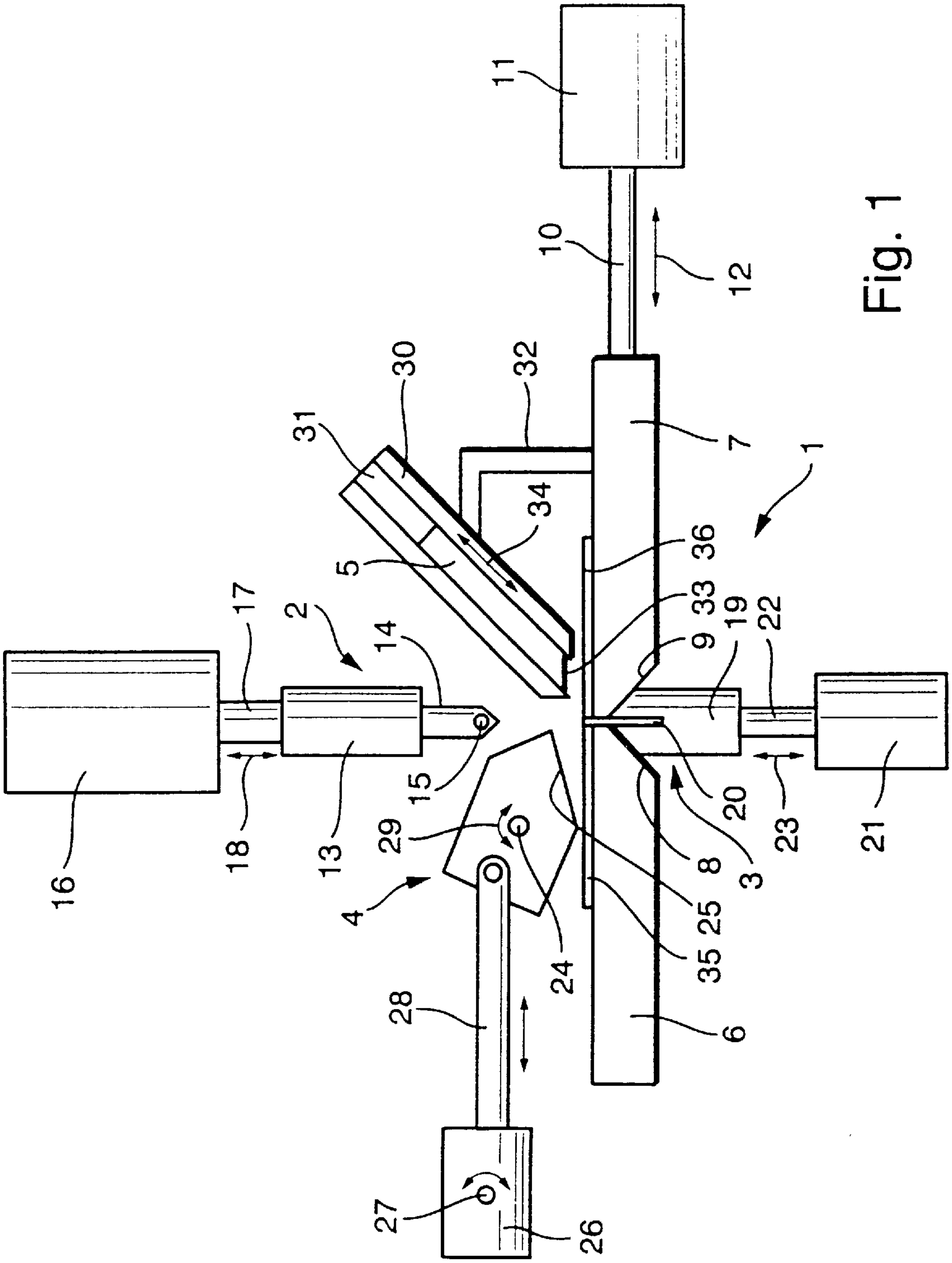

The invention relates to a veneer-jointing machine.

In order to produce large-surface veneers from small strips of veneer, these strips must be joined edge to edge. Since veneers are primarily used for furniture, it is desirable to produce veneers with a uniform surface appearance.

The use of taping paper for joining veneer strips has long been known. Strips of kraft paper, provided with glue on one side, serve as taping paper. The taping paper is applied and the veneer strips are joined in so-called veneer joint pasting machines. However, the use of taping paper has proven to be disadvantageous. If the taping paper is located on the outside of the veneer, it must be removed again once the veneer is installed. Taping paper that is applied to the inside of the veneer reduces the bonding strength and, above all, the resistance to moisture of the adhesive bond.

Also known is the use of a glue thread that is placed between the edges to be joined. However this procedure also proves to be problematic because in some cases the glue thread remains visible during the further processing of the veneer.

In order to save the costs for the glue thread or taping paper and to avoid the above-mentioned disadvantages, efforts are made to omit the use of these. A plurality of veneer-jointing machines have been developed, which require neither taping paper nor glue thread. Normally these machines are provided with a large table of metal or wood. The veneer strips to be joined are supplied manually along a holding bar until they are gripped by feed rollers and transferred to the conveying system. The edges of the veneer strips to be joined are coated with glue either prior to the joining, or glue is applied automatically in the veneer-jointing machine. The joint pressure necessary for gluing together the strips is achieved with slanted rollers or a wedge-shaped positioning of the conveying belts.

However, the disadvantage of these machines is that the user is not given the opportunity to produce veneers, which can be fitted together prior to the gluing, so that a desired surface appearance is visible.

German Patent 28 28 901 A1 discloses a device for the fitting together and gluing of veneer strips, with which a plurality of veneer strips can be joined simultaneously. A movable delivery table serves as feeding device, on which the veneer strips are placed side-by-side and ready for assembly in the desired arrangement. The delivery table is inserted into a pressing apparatus, consisting of two pressing plates and one setting device, in which the veneer strips are joined. However, the options of orienting side-by-side arranged veneer strips toward each other are very limited because of the machine design. Also, the above-described apparatus is not suitable for joining veneer strips with a narrow width. German Patent 31 52 554 discloses a device for gluing together plates. In that case, the two plates to be joined are positioned and pushed together by means of two light-barrier controlled conveyor belts. A pasting machine then presses glue under high pressure and with the aid of nozzles into the area to be glued. This device has a complicated design and an observation of the veneer appearance is hardly possible during the joining.

It is the object of the present invention to propose a veneer-jointing machine, which enables the user to join veneer strips with narrow width and, in the process, predetermine the surface appearance as desired.

This object is solved by providing the veneer-jointing machine with a two-part worktable, having a fixed table plate as well as a movable table plate that can be joined to the fixed one, further having a heating device that is arranged above the table plate juncture and can be lowered, a positioning jig that is located below the table plate juncture, opposite the heating device, and can be raised between the table plates, a clamping rail that is arranged above the fixed table plate and is effective in the direction of the table plate, as well as several pressure shoes, arranged side-by-side on the movable table plate, which can be moved at an acute angle to the movable table plate in the direction of the table plate juncture.

Advantageous modifications follow from the claims 2 to 10.

In the starting position, the positioning jig is located between the two table plates. A veneer strip is initially placed on each of the two table plates, in such a way that the pre-pasted edges of the veneer strips fit flush against the positioning jig. The user then can move these strips parallel to each other along the positioning jig until the desired surface appearance is visible. The veneer strips are then secured with the clamping rail and the pressure shoes, the positioning jig is lowered, and the movable table plate is moved in the direction of the fixed table plate, until the edges of the veneer strips adjoin. Since the pressure shoes can be moved at an acute angle to the movable table plate, in the direction of the table plate juncture, these pressure shoes can be used to additionally press the veneer strip on the movable table plate against the second veneer strip. The joint pressure can thus be increased and any unevenness in the veneer strip edges can be compensated.

The heating device is subsequently lowered and the glue applied to the edges is heated with this device. Following a predetermined interval, the heating device is moved back to the starting position, the glue hardens and joins the two veneer strips.

Prior to removing the veneer, the pressure shoes and the clamping rail are released. As soon as the movable table plate has returned to its starting position and the positioning jig between the table plates is raised, the following veneer strips can be inserted.

The veneer-jointing machine according to the invention allows the user to exactly predetermine the surface appearance of the veneer by displacing the veneer strips along the positioning jig. The device according to the invention also permits joining veneer strips with narrow widths and even veneer strips of varied lengths and widths.

It is advantageous if the movable table plate can be moved with the aid of a first lifting cylinder, by means of a first piston. For this, pneumatic or even hydraulic lifting cylinders can be used, which are available in a plurality of different embodiments. The lifting cylinder can move the movable table plate to the exact, predetermined position and without force expenditure by the user.

It is advantageous if the heating device can be lowered with the aid of a second lifting cylinder and via a second piston.

The heating device preferably comprises a heating cartridge with an electrical resistor element, with which the necessary temperature can be adjusted precisely.

It is advantageous if the positioning jig can be lifted with a third lifting cylinder and via a third piston.

The positioning jig preferably comprises a thin, upward pointing blade. At the start of the process, this blade is positioned between the table plates and projects somewhat over these plates. The veneer strips, which are arranged tightly joined and side-by-side, can be oriented toward each other without problems along this blade.

The use of a fourth lifting cylinder and a fourth piston recommends itself for the operation of the clamping rail.

The clamping rail preferably can be tilted around a shaft, relative to the fixed table plate. In this way, it is possible to exactly meter out the pressure the clamping rail exerts on the veneer strips positioned on the table plate.

It is advantageous if the pressure shoes are each arranged inside a guide of a cylinder, such that they can be adjusted.

It is possible to activate the pressure shoes jointly as well as separately. If the pressure exerted by these in the direction of the table plate can be adjusted separately for each pressure shoe, it is possible to compensate exactly for uneven edges of the veneer strips.

One advantageous design of the veneer-jointing machine is provided with a central control for coordinating the individual process steps in order to simplify and accelerate the production process. Thus, after the veneer strips are inserted and oriented, the following process steps are executed automatically by pushing a button.

Figure 2:
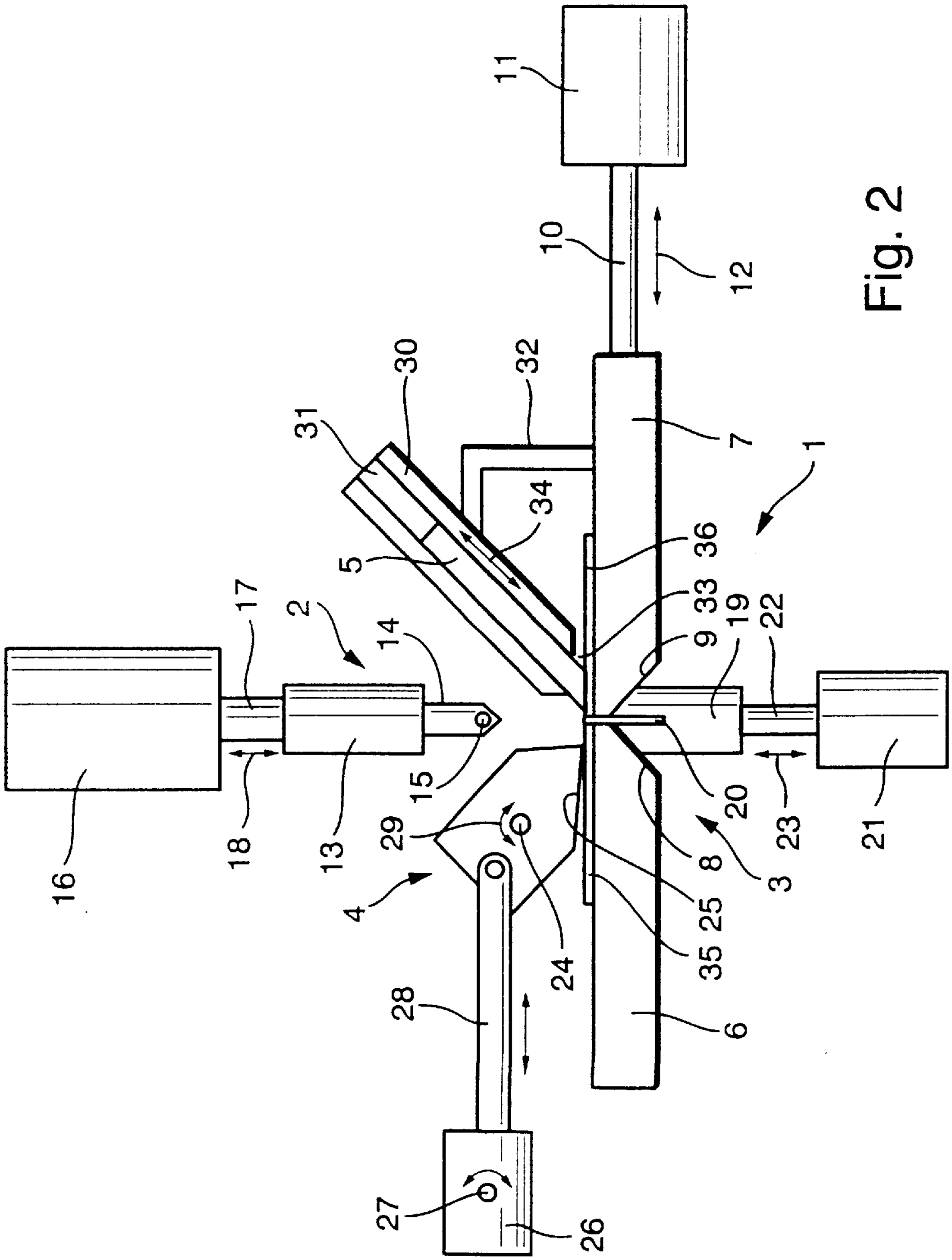
Figure 3:
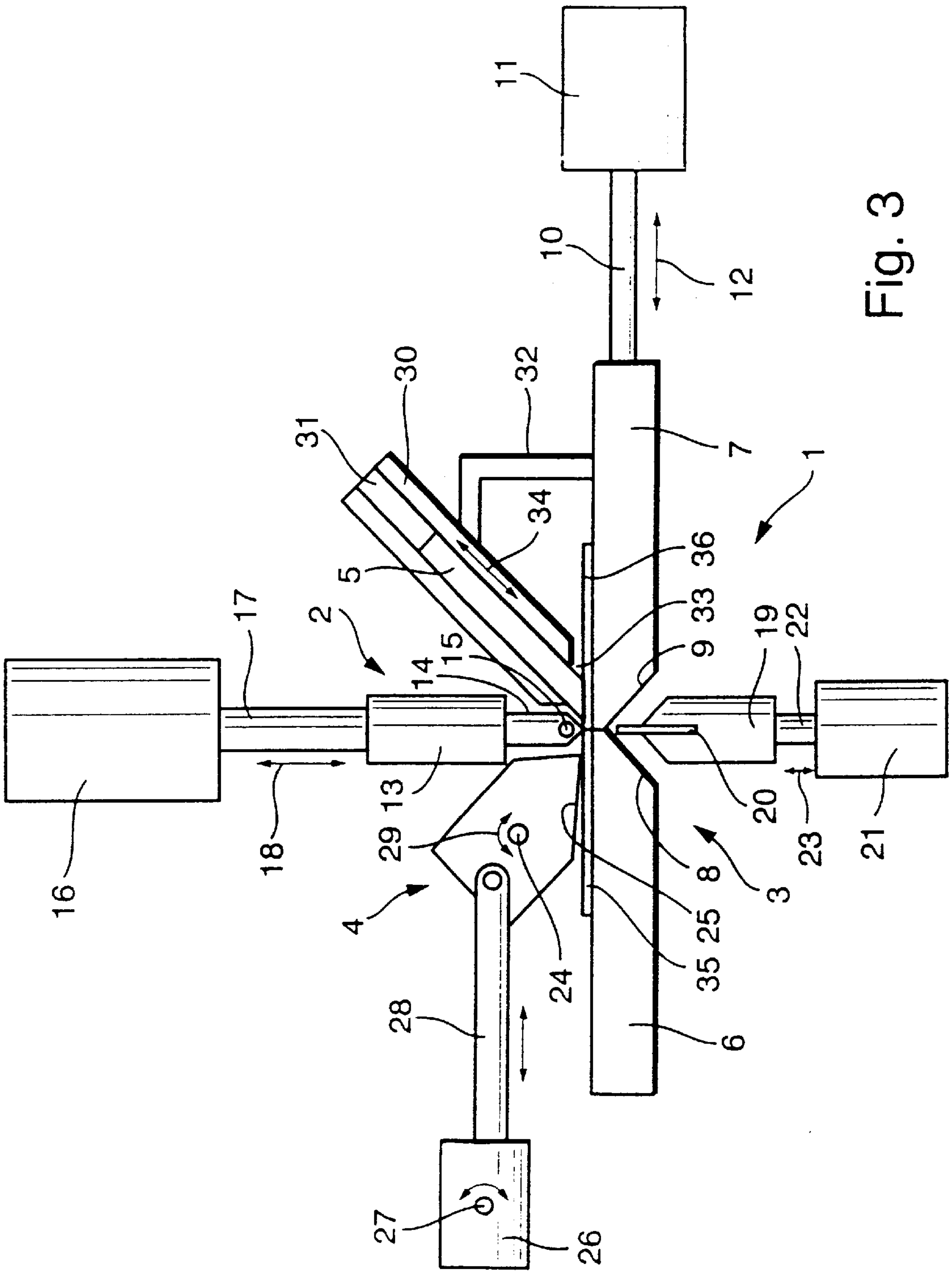

One exemplary embodiment of the invention is explained in further detail in the following with the aid of the enclosed three drawings. In a diagrammatic view from the side, the drawings, FIGS. 1–3, show a veneer-jointing machine according to the invention, in successive processing steps.

According to FIG. 1, the veneer-jointing machine comprises a two-part worktable 1, a heating device 2 that can be lowered, a positioning jig 3 that is arranged opposite the heating device, a clamping rail 4, as well as several side-by-side arranged pressure shoes 5, of which only the first one is shown herein.

The worktable comprises a fixed table plate 6 and a movable table plate 7. The identically shaped, thick table plates 6, 7 have respectively one beveled edge 8, 9, located opposite each other.

One end of a first piston 10 is attached to the movable table plate, on the edge opposite the beveled edge 9, while the other end is guided inside a first lifting cylinder 11. The movable table plate 7 thus can be moved in the direction of arrow 12 with the aid of the first lifting cylinder 11 and by means of the first piston 10.

The heating device 2 is located above the two table plates 6, 7. It comprises a supporting element 13 that holds a heating cartridge 14. An electric resistor element 15 is located in the region of the lower end of heating cartridge 14. The heating device 2 can be lowered in the direction of arrow 18 by means of a second lifting cylinder 16, arranged above it, and a second piston 17.

According to FIG. 1, the positioning jig 3 is arranged opposite the heating device 2, between the two table plates 6, 7. The jig comprises a holding element 19, the upper roof-shaped end of which is designed to correspond to the beveled edges 8, 9 of the two table plates 6, 7. Inserted into this upper end and pointing vertically upwards is a thin, rigid blade 20.

The positioning jig 3 can be moved with the aid of a third lifting cylinder 21 and via a third piston 22 in the direction of arrow 23.

The massive clamping rail 4 has a pentagonal cross section. Its length corresponds approximately to the width of the fixed table plate 6. The clamping rail 4 is positioned so as to rotate on a shaft 24 and has a flat, rectangular clamping side 25. With a fourth lifting cylinder 26, positioned so as to rotate around a shaft 27, the clamping rail 4 can be tilted in the direction of arrow 29 around the shaft 24, by means of a fourth piston 28, such that the clamping side 25 is moved toward the fixed table plate 6. The fourth piston 28 is fastened such that it can pivot on the clamping rail 4. During the movement back and fourth of the fourth piston 28, the fourth lifting cylinder 26 rotates around the shaft 27.

The pressure shoe 5 is arranged movably in an elongated cylinder 30, inside a guide 31. The cylinder 30 is attached with the aid of a holder 32, having a right-angle bent, to the movable table plate 7.

The guide 31 has a circular cross section that corresponds to that of the pressure shoe 5. The lower end of cylinder 30 contains an opening 33, through which the pressure shoe 5 can be moved pneumatically in the direction of arrow 34, at an acute angle to the movable table plate 7.

The operational sequence is described in further detail in the following with the aid of the drawings.

At the start of the operation, the blade 20 of the positioning jig 3 is positioned between the two table plates 6, 7 and projects somewhat over these plates. The veneer strips 35, 36 are then placed on. The edges of these strips to be joined were previously treated with glue. The veneer strips 35, 36 are placed on the table plates in such a way that they fit against opposite sides of the blade 20. Subsequently, the user can orient the two veneer strips 35, 36 along the blade 20, until the desired surface appearance results (FIG. 1).

Following this, the first veneer strip 35 is secured with the clamping rail 4 by tilting the same and the second veneer strip 36 is secured with the pressure shoes 5 (FIG. 2).

The positioning jig 3 is then lowered and the movable table plate 7 is moved toward the fixed table plate 6, until the edges of the veneer strips 35, 36 meet. Following that, the second veneer strip 36 can be pushed additionally against the first veneer strip 35 with the aid of pressure shoes 5. Any unevenness in the edges of the veneer strips 35, 36 can be compensated in this way.

Subsequently, the heating device 2 that is arranged above the juncture of the two table plates 6, 7 is lowered until the heating cartridge 14 is positioned directly above the juncture of the two veneer strips 35, 36. The electrical resistor element 15 heats the glue on the edges of the veneer strips (FIG. 3). After the heating device 2 has been moved back to the starting position, the glue hardens and joins the two veneer strips 35, 36.

The clamping rail 4 and the pressure shoes 5 are then released, so that the veneer composed of the joined veneer strips 35, 36 can be removed.

LIST OF REFERENCE NUMBERS

1 worktable
2 heating device
3 positioning jig
4 clamping rail
5 pressure shoe
6 table plate (fixed)
7 table plate (movable)
8 edge (of 6)
9 edge (of 7)
10 piston (first)
11 lifting cylinder (first)
12 arrow
13 support element
14 heating cartridge

15 resistor element
16 lifting cylinder (second)
17 piston (second)
18 arrow
19 holding element
20 blade
21 lifting cylinder (third)
22 piston (third)
23 arrow
24 shaft (of 4)
25 clamping side
26 lifting cylinder (fourth)
27 shaft (of 26)
28 piston (fourth)
29 arrow
30 cylinder
31 guide
32 holder
33 opening
34 arrow
35 veneer strip (first)
36 veneer strip (second)

What is claimed is:

1. A veneer-jointing machine, comprising:

a two-part worktable (1) with a fixed table plate and a movable table plate (6, 7), which can be joined to the fixed one;

a heating device (2) that can be lowered and is arranged above the junction of the table plates (6, 7);

a positioning jig (3) that is located below the junction of the table plates (6, 7) and opposite the heating device (2) and can be raised between the table plates (6, 7);

a clamping rail (4) that is arranged above the fixed table plate (6) and is active in the direction of the fixed table plate (6);

as well as several pressure shoes (5), arranged side-by-side on the movable table plate (7), which can be moved at an acute angle to the table plate, in the direction of the junction of the table plates.

2. A veneer-jointing machine according to claim 1, characterized in that the movable table plate (7) can be moved with the aid of a first lifting cylinder (11) and by means of a first piston (10).

3. A veneer-jointing machine according to claim 1, characterized in that the heating device (2) can be lowered with the aid of a second lifting cylinder (16) and via a second piston (17).

4. A veneer-jointing machine according to claim 1, characterized in that the heating device (2) comprises a heating cartridge (14) with an electric resistor element (15).

5. A veneer-jointing machine according to claim 1, characterized in that the positioning jig (3) can be raised with a third lifting cylinder (21) and via a third piston (22).

6. A veneer-jointing machine according to claim 1, characterized in that the positioning jig (3) comprises a thin, upward pointing blade (20), which projects over the table plates (6, 7) if the positioning jig (3) is raised.

7. A veneer-jointing machine according to claim 1, characterized in that the clamping rail (4) can be operated with the aid of a fourth lifting cylinder (26) and by means of a fourth piston (28).

8. A veneer-jointing machine according to claim 1, characterized in that the clamping rail (4) can be tilted around a shaft (24), relative to the fixed table plate (6).

9. A veneer-jointing machine according to claim 1, characterized in that the pressure shoes (5) are each arranged inside a guide (31) of a cylinder (30), such that they can be adjusted.

10. A veneer-jointing machine according to claim 1, characterized in that the pressure shoes (5) can be moved separately.

* * * * *